United States Patent
Ichihara

(10) Patent No.: US 9,030,567 B2
(45) Date of Patent: May 12, 2015

(54) IMAGE CAPTURE APPARATUS AND SETTING TIME INFORMATION

(71) Applicant: Canon Kabushiki Kaisha, Tokyo (JP)

(72) Inventor: Atsushi Ichihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/780,341

(22) Filed: Feb. 28, 2013

(65) Prior Publication Data

US 2013/0229538 A1 Sep. 5, 2013

(30) Foreign Application Priority Data

Mar. 1, 2012 (JP) .................................. 2012-045902

(51) Int. Cl.
*H04N 5/232* (2006.01)
*H04N 5/76* (2006.01)
*H04B 17/00* (2006.01)

(52) U.S. Cl.
CPC ..................................... *H04N 5/232* (2013.01)

(58) Field of Classification Search
CPC ......... G06F 1/10; G06F 1/12; G06F 11/1604; G06F 11/1679; G06F 17/5031; G06F 1/04; G06F 1/08; G06F 1/14; H04J 3/0697; H04J 3/0667; H04J 3/0638; H04J 3/0647; H04J 3/0661; H04J 3/0664; H04J 3/0682; H04N 13/02
USPC .............................. 348/231.5, 211.1–211.14; 455/67.11–67.16
See application file for complete search history.

(56) References Cited

U.S. PATENT DOCUMENTS

| | | | | |
|---|---|---|---|---|
| 5,083,299 | A * | 1/1992 | Schwanke et al. | 368/113 |
| 5,903,308 | A * | 5/1999 | Cooper et al. | 348/211.9 |
| 5,987,619 | A * | 11/1999 | Hamamoto et al. | 713/401 |
| 6,023,615 | A * | 2/2000 | Bruckert et al. | 348/14.08 |
| 6,961,082 | B2 * | 11/2005 | Miura et al. | 348/211.9 |
| 7,023,252 | B2 * | 4/2006 | Schultz | 327/161 |
| 7,395,548 | B2 * | 7/2008 | Runzo | 725/107 |
| 7,751,945 | B2 * | 7/2010 | Obata | 701/1 |
| 8,001,504 | B1 * | 8/2011 | Campbell | 716/106 |
| 8,514,972 | B2 * | 8/2013 | Kang et al. | 375/296 |
| 8,630,314 | B2 * | 1/2014 | York | 370/503 |
| 8,826,353 | B2 * | 9/2014 | Takahashi | 725/105 |
| 2002/0040985 | A1 * | 4/2002 | Aldrich | 257/202 |
| 2004/0033777 | A1 * | 2/2004 | Farineau et al. | 455/3.02 |
| 2005/0179942 | A1 * | 8/2005 | Stavely et al. | 358/1.15 |
| 2007/0198202 | A1 * | 8/2007 | Fishman et al. | 702/69 |
| 2007/0266256 | A1 * | 11/2007 | Shah et al. | 713/178 |
| 2008/0025344 | A1 * | 1/2008 | Biederman et al. | 370/498 |

(Continued)

FOREIGN PATENT DOCUMENTS

JP 10-028119 A 1/1998

*Primary Examiner* — Chia-Wei A Chen
(74) *Attorney, Agent, or Firm* — Canon U.S.A., Inc., IP Division

(57) ABSTRACT

An image capture apparatus includes an internal time information generating unit that includes an internal time source, a receiving unit configured to receive external time information generated in an external time source, and an adjusting unit configured to adjust the external time information using a first delay time information corresponding to a delay time generated in a communication path between the internal time information generating unit and a time setting unit, wherein the time setting unit is configured to perform a process for setting the external time information adjusted by the adjusting unit to the internal time source.

20 Claims, 7 Drawing Sheets

(56) References Cited

U.S. PATENT DOCUMENTS

| | | | |
|---|---|---|---|
| 2009/0106604 A1* | 4/2009 | Lange et al. | 714/45 |
| 2009/0245228 A1* | 10/2009 | Osterling | 370/350 |
| 2010/0058095 A1* | 3/2010 | Malek | 713/375 |
| 2011/0051754 A1* | 3/2011 | Lansdowne | 370/503 |
| 2011/0119475 A1* | 5/2011 | Chen et al. | 713/2 |
| 2011/0205380 A1* | 8/2011 | Shirakawa | 348/211.9 |
| 2011/0267481 A1* | 11/2011 | Kagei | 348/211.9 |
| 2012/0023314 A1* | 1/2012 | Crum et al. | 712/214 |
| 2012/0086599 A1* | 4/2012 | Mo et al. | 342/357.31 |
| 2012/0221889 A1* | 8/2012 | Beilin et al. | 714/12 |
| 2012/0266008 A1* | 10/2012 | Coteus et al. | 713/400 |
| 2013/0086541 A1* | 4/2013 | Luo et al. | 716/112 |
| 2013/0101160 A1* | 4/2013 | Woodfill et al. | 382/103 |
| 2013/0159757 A1* | 6/2013 | Park et al. | 713/400 |
| 2013/0173950 A1* | 7/2013 | Banerjea et al. | 713/503 |
| 2013/0343409 A1* | 12/2013 | Haulin | 370/503 |
| 2013/0346936 A1* | 12/2013 | Kennedy et al. | 716/122 |

* cited by examiner

IMAGE CAPTURE APPARATUS AND SETTING TIME INFORMATION

BACKGROUND OF THE INVENTION

1. Field of the Invention

The present invention relates to an image capture apparatus including an internal time source such as a real time clock.

2. Description of the Related Art

An image capture apparatus such as a digital camera includes an internal time source such as a real time clock (RTC). The image capture apparatus can generate image capture time information based on time information generated by the internal time source. The image capture time information is stored in a storage medium with image data generated by the image capture apparatus.

In a case where a time difference is observed between time information generated by the internal time source and an actual time, a user can set a time of the internal time source. However, in a case where the user set the time manually, the time difference between the time information generated by the internal time source and the actual time may become larger. For example, in a case where the time difference between the time information generated by the internal time source and the actual time is a millisecond time scale, it is highly possible that the time difference between the time information generated by the internal time source and the actual time becomes larger.

To solve the above-described issue, a method for setting a time of the internal time source using precise time information generated by an external time source is discussed. Japanese Patent Application Laid-Open No. 10-28119 discusses a method in which time information generated by a master device is transmitted to a terminal device and a time of the terminal device is set using the time information. According to the method discussed in Japanese Patent Application Laid-Open No. 10-28119, the master device can calculate a delay time generated in a transmission path between the master device and the terminal device in real time and can add the delay time calculated by the master device to the time information generated by the master device. The resulting time information is transmitted to the terminal device to be set to the terminal device.

However, the method discussed in Japanese Patent Application Laid-Open No. 10-28119 has such an issue that the delay time generated in the transmission path between the master device and the terminal device is taken into consideration but a delay time generated in the terminal device is not considered.

If a user desires to set a high-resolution internal time source more precisely, it is desirable to consider the time delay generated in the terminal device. For example, it is desirable to consider a delay time generated in a communication path between the internal time source (e.g., the RTC) and a time setting unit (e.g., a central processing unit (CPU)) for setting external time information obtained from the external time source to the internal time source. Furthermore, for example, it is desirable to consider a delay time generated in a communication path between a communication unit for receiving the external time information generated by the external time source and the time setting unit (e.g., the CPU) for setting the external time information to the internal time source (e.g., the RTC).

A method for calculating the delay time generated in the terminal device in real time puts a heavy load on the CPU of the terminal device. Particularly, in a case where the terminal device is the image capture apparatus, if a method for calculating the delay time generated within the terminal device in real time is employed for the terminal device, a release timing may be delayed and a user may miss the best shot.

SUMMARY OF THE INVENTION

According to an aspect of the present invention, at least one the above-described drawbacks and disadvantages are overcome.

According to an aspect of the present invention, a time can be set to an internal time source more precisely.

According to another aspect of the present invention, a time can be set to an internal time source in consideration with a delay time generated in a communication path between the internal time source and a time setting unit for setting external time information obtained from an external time source to the internal time source.

According to another aspect of the present invention, a time can be set to an internal time source without calculating, in real time, a delay time generated in a communication path between the internal time source and a time setting unit for setting external time information obtained from an external time source to the internal time source.

According to another aspect of the present invention, a time can be set to an internal time source in consideration with a delay time generated in a communication path between a communication unit for receiving external time information generated in an external time source and a time setting unit for setting the external time information to the internal time source.

According to another aspect of the present invention, a time can be set to an internal time source without calculating, in real time, a delay time generated in a communication path between a communication unit for receiving external time information generated in an external time source and a time setting unit for setting the external time information to the internal time source.

According to another aspect of the present invention, there is provided an image capture apparatus including an internal time information generating unit that includes an internal time source, a receiving unit configured to receive external time information generated in an external time source, and an adjusting unit configured to adjust the external time information using a first delay time information corresponding to a delay time generated in a communication path between the internal time information generating unit and a time setting unit, wherein the time setting unit is configured to performs a process for setting the external time information adjusted by the adjusting unit to the internal time source.

According to another aspect of the present invention, there is provided a method including receiving external time information generated in an external time source, adjusting the external time information using first delay time information corresponding to a delay time generated in a communication path between an internal time information generating unit and a time setting unit, wherein the internal time information generating unit and the time setting unit are included in an image capture apparatus, and wherein an internal time source is included in the internal time information generating unit, and performing a process for setting the adjusted external time information to the internal time source.

According to another aspect of the present invention, there is provided a non-transitory storage medium that stores a program for causing a computer to execute a method including receiving external time information generated in an external time source, adjusting the external time information using first delay time information corresponding to a delay time generated in a communication path between an internal time information generating unit and a time setting unit, wherein the internal time generating unit and the time setting unit are included in an image capture apparatus, and wherein an internal time source is included in the internal time information generating unit, and performing a process for setting the adjusted external time information to the internal time source.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Various exemplary embodiments, features, and aspects of the present invention will be described in detail below with reference to the drawings.

A first exemplary embodiment is described below with reference to FIGS. 1 through 7.

Figure 1:
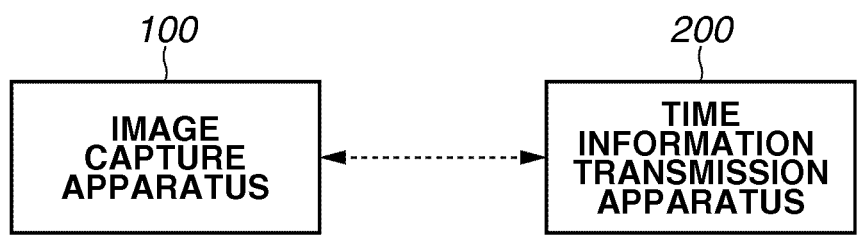
FIG. 1 is a block diagram illustrating components included in an image capture system according to a first exemplary embodiment.

FIG. 1 is a block diagram illustrating components included in an image capture system according to the first exemplary embodiment.

As illustrated in FIG. 1, the image capture system according to the first exemplary embodiment includes an image capture apparatus 100 and a time information transmission apparatus 200. Communication between the image capture apparatus 100 and the time information transmission apparatus 200 can be carried out via either one of wired communication and wireless communication.

The image capture apparatus 100 can act as a digital camera. The image capture apparatus 100 includes, for example, at least one of a digital camera, a digital video camera, a cell phone with a camera, a mobile terminal with a camera, and a computer with a camera.

The time information transmission apparatus 200 is a high-resolution and high-precision external time source. The time information transmission apparatus 200 can generate precise external time information Te. According to the first exemplary embodiment, a case where the time information transmission apparatus 200 has a resolution of, but not limited to, 1/100 second is described. In a case where the time information transmission apparatus 200 has a resolution of 1/100 second, the time information transmission apparatus 200 can generate the external time information Te including, for example, year, month, day, hour, minute, second, 1/10 second, and 1/100 second. The external time information Te generated in the time information transmission apparatus 200 is transmitted from the time information transmission apparatus 200 to the image capture apparatus 100 via either one of the wired communication and the wireless communication. The time information transmission apparatus 200 includes at least one of, for example, a Global Positioning System (GPS) server and a Network Time Protocol (NTP) server.

Figure 2:
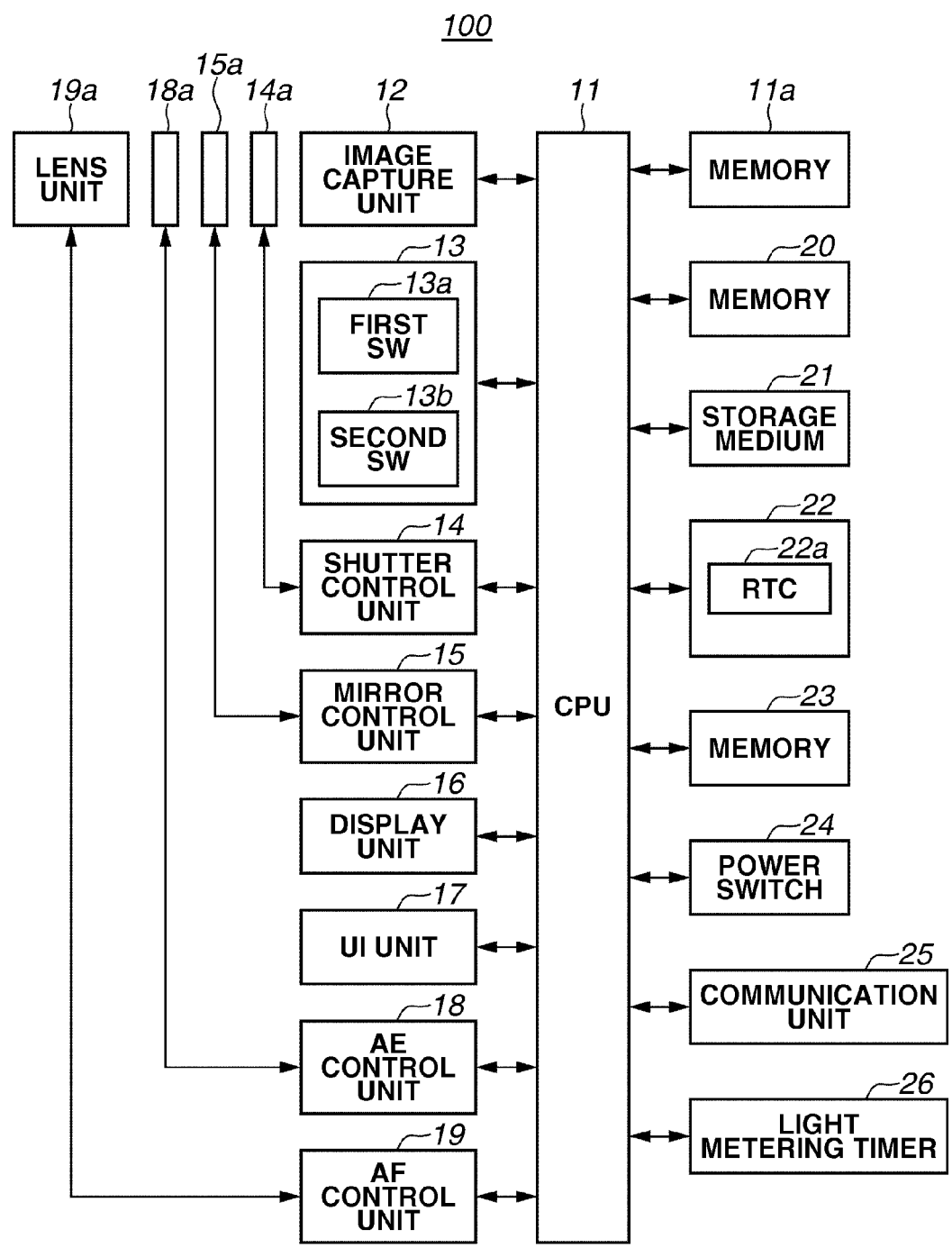
FIG. 2 is a block diagram illustrating components included in an image capture apparatus according to the first exemplary embodiment.

FIG. 2 is a block diagram illustrating components included in the image capture apparatus 100 according to the first exemplary embodiment.

As illustrated in FIG. 2, the image capture apparatus 100 includes a central processing unit (CPU) 11, a memory 11a, an image capture unit 12, a release switch 13, a shutter control unit 14, a shutter 14a, a mirror control unit 15, a mirror 15a, a display unit 16, and a user interface (UI) unit 17. The image capture apparatus 100 further includes, as illustrated in FIG. 2, an automatic exposure (AE) control unit 18, a diaphragm 18a, an automatic focus (AF) control unit 19, a lens unit 19a, a memory 20, a storage medium 21, a real time clock (RTC) unit 22, a real time clock (RTC) 22a, a memory 23, a power switch 24, a communication unit 25, and a light metering timer 26. The diaphragm 18a and the lens unit 19a may be formed into one piece. The diaphragm 18a and the lens unit 19a may be detachable from the image capture apparatus 100.

The CPU 11 includes a processor for controlling the image capture apparatus 100. The memory 11a is a work memory of the processor.

The image capture unit 12 includes an image sensor for converting a captured optical image into an electric signal and an analog-to-digital (A/D) converter for converting the electric signal output from the image sensor into a digital signal. The image capture unit 12 further includes an image data generation unit for generating image data based on the digital signal output from the A/D converter.

The release switch 13 is a two-step switch including a first switch (SW) 13a and a second switch (SW) 13b. In a case where the release switch 13 is neither half pressed nor fully pressed, both of the first SW 13a and the second SW 13b are in an OFF state. In a case where the release switch 13 is half pressed, the first SW 13a is turned ON but the second SW 13b is remained in the OFF state. In a case where the release switch 13 is fully pressed, both of the first SW 13a and the second SW 13b are turned ON. In a case where the CPU 11 detects that a release button of a remote controller of the image capture apparatus 100 is pressed, the CPU 11 also treats as a case where the release switch 13 is fully pressed.

The shutter control unit 14 includes a circuit for controlling an operation of the shutter 14a. The shutter 14a includes a leading curtain and a trailing curtain. The mirror control unit 15 includes a circuit for controlling an operation of the mirror 15a.

The display unit 16 includes a display such as a liquid crystal display. An image captured by the image capture unit 12 is displayed on the display unit 16. An image corresponding to image data stored in the storage medium 21 is displayed on the display unit 16. A setting menu for setting the image capture apparatus 100 and an operation menu for operating the image capture apparatus 100 are displayed on the display unit 16.

The UI unit 17 includes various instruction means (e.g., switches, buttons, and dials) for inputting an instruction from a user to the image capture apparatus 100. The user can select an image shooting mode, a value of the diaphragm, and a transit time of the shutter 14a by operating the UI unit 17.

The AE control unit 18 includes a circuit for controlling an automatic exposure (AE). The AE control unit 18 measures an exposure state of an object.

The AF control unit 19 includes a circuit for controlling an automatic focus (AF). The AF control unit 19 measures an in-focus state of an object and measures a distance between the object and the image capture apparatus 100.

The memory 20 stores various programs to be executed by the CPU 11. The below described programs Pg1, Pg2, Pg3, and Pg4 are also stored in the memory 20. The CPU 11 can control the image capture apparatus 100 according to various programs stored in the memory 20.

The storage medium 21 stores image data generated by the image capture apparatus 100. The storage medium 21 is either one of a storage medium detachable from the image capture apparatus 100 or a storage medium comprised in the image capture apparatus 100. An example of the storage medium 21 detachable from the image capture apparatus 100 includes a memory card. The image capture apparatus 100 can read image data stored in the storage medium 21 therefrom and displays the read image data on the display unit 16.

The RTC unit 22 includes the RTC 22a as a high-resolution internal time source. According to the first exemplary embodiment, a case where the RTC 22a has a resolution of, but not limited to, $1/100$ second is described. In a case where the RTC 22a has the resolution of $1/100$ second, the RTC 22a can generate internal time information Ti including, for example, year, month, day, hour, minute, second, $1/10$ second, and $1/100$ second. The internal time information Ti generated in the RTC 22a is supplied to the CPU 11.

The memory 23 stores delay time information Td1 (i.e., first delay time information), delay time information Td2 (i.e., second delay time information), and delay time information Td3 (i.e., third delay time information). The delay time information Td1 indicates a delay time DT1 generated in a communication path between the CPU 11 and the RTC 22a. The delay time information Td2 indicates a delay time DT2 generated in a communication path between the image capture apparatus 100 and the time information transmission apparatus 200. The delay time information Td3 indicates a delay time DT3 generated in a communication path between the communication unit 25 and the CPU 11. According to the first exemplary embodiment, a case where the CPU 11 generates the delay time information Td1, the delay time information Td2, and the delay time information Td3 at predetermined timings and stores these generated information in the memory 23 is described. The delay time information Td2 and the delay time information Td3 may be fixed values. The delay time information Td2 may be generated in the time information transmission apparatus 200, and the image capture apparatus 100 may obtain the generated delay time information Td2 from the time information transmission apparatus 200.

The power switch 24 controls a power source of the image capture apparatus 100. When the power switch 24 is turned ON, the CPU 11 activates the image capture apparatus 100. When the power switch 24 is turned OFF, the CPU 11 starts a third RTC setting process.

A communication unit 25 can communicate with the time information transmission apparatus 200. The external time information Te transmitted from the time information transmission apparatus 200 is received by the communication unit 25. The communication between the communication unit 25 and the time information transmission apparatus 200 may be made via either one of the wired communication or the wireless communication.

The light metering timer 26 starts counting from zero. A count value of the light metering timer 26 is supplied to the CPU 11 from the light metering timer 26.

Figure 3:
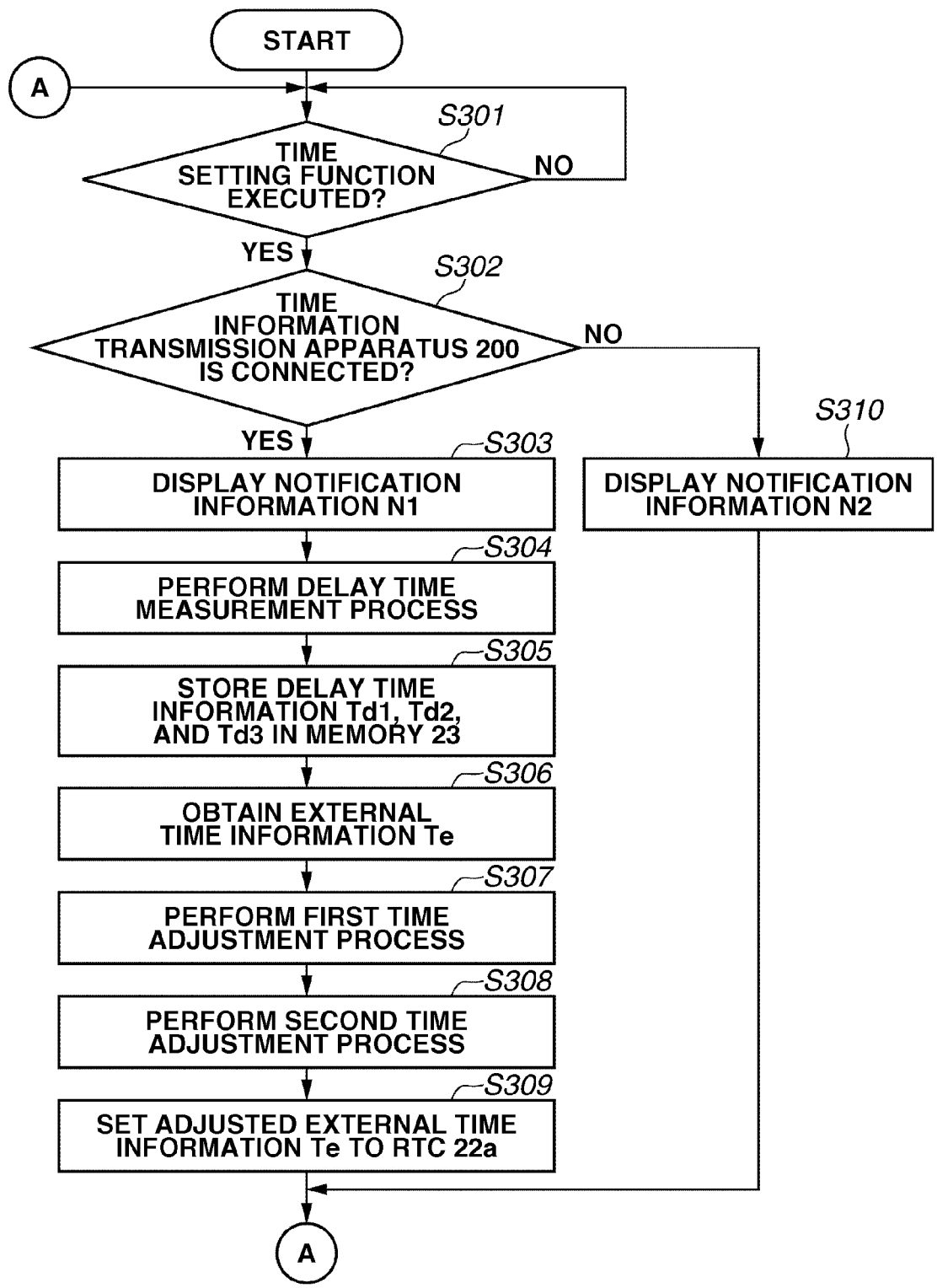
FIG. 3 is a flow chart illustrating a first real-time clock (RTC) setting process to be executed by the image capture apparatus according to the first exemplary embodiment.

FIG. 3 is a flow chart illustrating a first RTC setting process to be executed by the image capture apparatus 100 according to the first exemplary embodiment.

The first RTC setting process is started, for example, when the power switch 24 is turned ON and the image capture apparatus 100 is activated. The first RTC setting process is controlled by the CPU 11. The CPU 11 can control the first RTC setting process by executing the program Pg1 stored in the memory 20.

In step S301, the CPU 11 determines whether a user instructs execution of a time setting function. The user can instruct the CPU 11 to execute the time setting function via the UI unit 17. The time setting function is a function for adjusting, using the external time information Te received from the time information transmission apparatus 200, the RTC 22a so that the RTC 22a can generate more precise internal time information Ti.

If the user instructs execution of the time setting function (YES in step S301), the CPU 11 advances from step S301 to step S302. If the user does not instruct execution of the time setting function (NO in step S301), the CPU 11 repeats the process in step S301.

In step S302, the CPU 11 determines whether the image capture apparatus 100 and the time information transmission apparatus 200 are communicably connected to each other. The time information transmission apparatus 200 is an external time source capable of generating the external time information Te as precise time information.

If the image capture apparatus 100 and the time information transmission apparatus 200 are communicably connected to each other (YES in step S302), the CPU 11 advances from step S302 to step S303. If the image capture apparatus 100 and the time information transmission apparatus 200 are not communicably connected to each other (NO in step S302), the CPU 11 advances from step S302 to step S310.

Figure 7:
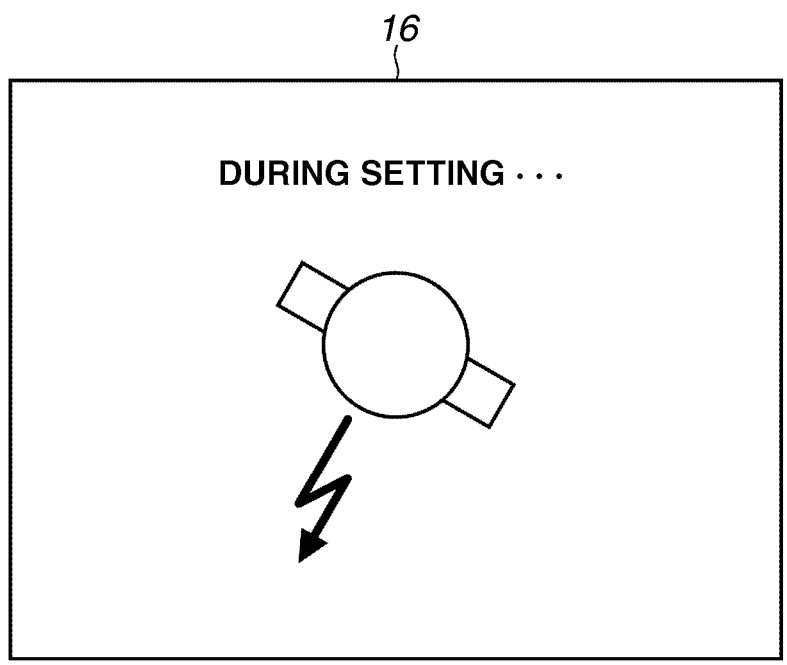
FIG. 7 illustrates an example of notification information for notifying a user that external time information is obtained from an external time source.

In step S303, the CPU 11 causes the display unit 16 to display notification information N1 for notifying the user to the effect that the external time information Te is obtained from the time information transmission apparatus 200. An example of the notification information N1 to be displayed on the display unit 16 is illustrated in FIG. 7. The display unit 16 can display the notification information N1, for example, until the process in step S309 ends.

In step S304, the CPU 11 performs a delay time measurement process in order to detect at least one of the delay time DT1, the delay time DT2, and the delay time DT3. The delay time DT1 indicates the latest delay time generated in the communication path between the CPU 11 and the RTC 22a. The delay time DT2 indicates the latest delay time generated in the communication path between the image capture apparatus 100 and the time information transmission apparatus 200. The delay time DT3 indicates the latest delay time generated in the communication path between the communication unit 25 and the CPU 11.

In step S305, the CPU 11 generates at least one of the delay time information Td1, the delay time information Td2, and the delay time information Td3. In a case where the delay time DT1 is detected in step S304, the CPU 11 generates the delay time information Td1 based on the delay time DT1 detected in step S304 and stores the generated delay time information Td1 in the memory 23. In a case where the delay time DT2 is detected in step S304, the CPU 11 generates the delay time information Td2 based on the delay time DT2 detected in step S304 and stores the generated delay time information Td2 in the memory 23. In a case where the delay time DT3 is detected in step S304, the CPU 11 generates the delay time information Td3 based on the delay time DT3 detected in step S304 and stores the generated delay time information Td3 in the memory 23.

In step S306, the CPU 11 obtains the external time information Te from the time information transmission apparatus 200 via the communication unit 25. The external time information Te is precise time information generated in the time information transmission apparatus 200.

In step S307, the CPU 11 performs a first time adjustment process for adjusting the external time information Te obtained in step S306 so as to be more precise time information. In the first time adjustment process, the CPU 11 adds the external time information Te obtained in step S306, the delay time information Td2, and the delay time information Td3. The delay time information Td2 indicates the delay time DT2 generated in the communication path between the image capture apparatus 100 and the time information transmission apparatus 200. The delay time information Td3 indicates the delay time DT3 generated in the communication path between the communication unit 25 and the CPU 11. In step S307, in a case where the time information transmission apparatus 200 generates the external time information Te and adds the delay time information Td2 to the external time information Te, the CPU 11 does not add the delay time information Td2 to the external time information Te obtained in step S306.

In step S308, the CPU 11 performs a second time adjustment process for adjusting the external time information Te adjusted in step S307 so as to be more precise time information. In the second time adjustment process, the CPU 11 adds the delay time information Td1 generated in step S305 to the external time information Te adjusted in step S307.

In step S309, the CPU 11 sets the external time information Te adjusted in step S308 to the RTC 22a such that the RTC 22a can generate more precise internal time information Ti. Accordingly, the CPU 11 can adjust the RTC 22a such that the RTC 22a can generate more precise time information. In step S309, the CPU 11 operates as a time setting unit for setting a time of the RTC 22a. After the external time information Te adjusted in step S308 is set to the RTC 22a, the CPU 11 returns to step S301.

In step S310, the CPU 11 causes the display unit 16 to display notification information N2 for notifying the user to the effect that the image capture apparatus 100 and the time information transmission apparatus 200 are not communicably connected to each other. The display unit 16 displays the notification information N2 for a predetermined time period. After the notification information N2 is displayed on the display unit 16, the CPU 11 returns to step S301.

As described above, according to the first RTC setting process of the first exemplary embodiment, in a case where the user instructs execution of the time setting function, the CPU 11 can generate the delay time information Td1, Td2, and Td3 and store these generated information in the memory 23. Furthermore, the CPU 11 can adjust the external time information Te using the delay time information Td1, Td2, and Td3 stored in the memory 23 and set the adjusted external time information Te to the RTC 22a. Accordingly, highly-precise time setting of the RTC 22a can be realized without calculating, in real time, the delay times TD1 and TD2 generated in the image capture apparatus 100 and the delay time TD3 generated in the communication path between the image capture apparatus 100 and the time information transmission apparatus 200.

Figure 4:
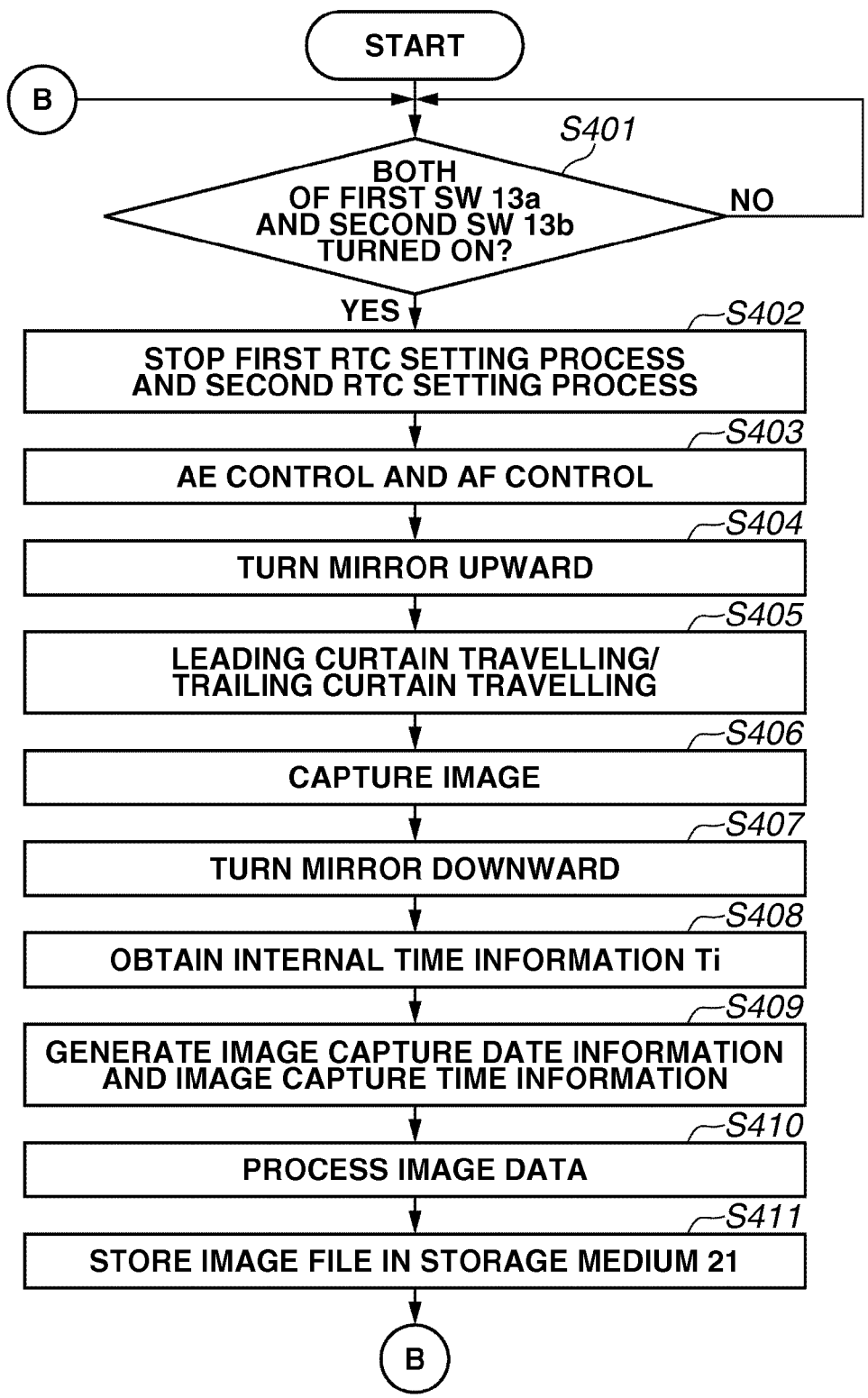
FIG. 4 is a flow chart illustrating an image capture process to be executed by the image capture apparatus according to the first exemplary embodiment.

FIG. 4 is a flow chart illustrating an image capture process to be executed by the image capture apparatus 100 according to the first exemplary embodiment.

The image capture process is started, for example, when the power switch 24 is turned ON and the image capture apparatus 100 is activated. The image capture process is controlled by the CPU 11. The CPU 11 can control the image capture process by executing the program Pg4 stored in the memory 20.

In step S401, the CPU 11 determines whether both of the first SW 13a and the second SW 13b are turned ON. Both of the first SW 13a and the second SW 13b are turned ON when the release switch 13 is fully pressed. If the CPU 11 detects that the release button of the remote controller of the image capture apparatus 100 is pressed, the CPU 11 determines that both of the first SW 13a and the second SW 13b are turned ON.

In a case where both of the first SW 13a and the second SW 13b are turned ON (YES in step S401), the CPU 11 advances from step S401 to step S402. In a case where none of the first SW 13a and the second SW 13b is turned ON (NO in step S401), the CPU 11 repeats the process in step S401.

In step S402, the CPU 11 stops the first RTC setting process and a second RTC setting process which are performed in parallel with the image capture process. Accordingly, the image capture process is performed in priority to the first RTC setting process and the second RTC setting process. The CPU 11 restarts the first RTC setting process and the second RTC setting process having stopped in step S402 after an image file storage process in step S411 ends.

In step S403, the CPU 11 transmits an AE start command to the AE control unit 18 and transmits an AF start command to the AF control unit 19. After the AE control unit 18 receives the AE start command from the CPU 11, the AE control unit 18 performs the AE control to calculate an appropriate and adequate exposure parameter. The CPU 11 controls the diaphragm 18a based on the exposure parameter calculated by the AE control unit 18. After the AF control unit 19 receives the AF start command from the CPU 11, the AF control unit 19 performs the AF control to calculate an appropriate focus parameter. The CPU 11 controls the lens unit 19a based on the focus parameter calculated by the AF control unit 19.

In step S404, the CPU 11 transmits a mirror-up command to the mirror control unit 15. After the mirror control unit 15 receives the mirror-up command from the CPU 11, the mirror control unit 15 turns the mirror 15a upward.

In step S405, the CPU 11 transmits a leading curtain travelling command and a trailing curtain travelling command to the shutter control unit 14 at a predetermined timing. The CPU 11 controls a transmission timing of the leading curtain travelling command and a transmission timing of the trailing curtain travelling command based on a shutter speed selected by the user. After the shutter control unit 14 receives the leading curtain travelling command from the CPU 11, the shutter control unit 14 causes the leading curtain to travel. After the shutter control unit 14 receives the trailing curtain travelling command from the CPU 11, the shutter control unit 14 causes the trailing curtain to travel.

In step S406, the CPU 11 transmits an image capture command to the image capture unit 12 at a timing of transmitting the leading curtain travelling command to the shutter control unit 14. After the image capture unit 12 receives the image capture command from the CPU 11, the image capture unit 12 captures an image to generate image data corresponding to an optical image. The image data generated by the image capture unit 12 is stored in the memory 20.

In step S407, the CPU 11 transmits a mirror-down command to the mirror control unit 15. After the mirror control unit 15 receives the mirror-down command from the CPU 11, the mirror control unit 15 turns the mirror 15a downward.

In step S408, the CPU 11 obtains the internal time information Ti generated in the RTC 22a.

In step S409, the CPU 11 generates image capture date information and image capture time information based on the internal time information Ti obtained in step S408. The image capture date information includes information indicating year, month, and day. The image capture time information includes information indicating hour, minute, second, 1/10 second, and 1/100 second. The CPU 11 serves as a image capture date information generating unit for generating the image capture date information as well as a image capture time information generating unit for generating the image capture time information.

In step S410, the CPU 11 processes the image data generated in step S406 according to a predetermined image adjustment process and a predetermined image compression process.

In step S411, the CPU 11 performs an image file generation process and an image file storage process. The image file generation process in step S411 is to generate an image file containing the image data processed in step S410 and the image capture date information and the image capture time information generated in step S409. The image file storage process in step S411 is to store the image file generated according to the image file generation process in the storage medium 21. If the image file storage process in step S411 ends, the CPU 11 returns to step S401. If the image file storage process in step S411 ends, the CPU 11 restarts the first RTC setting process and the second RTC setting process which have been stopped in step S402.

As described above, according to the image capture process of the first exemplary embodiment, the image capture date information and the image capture time information can be generated based on the internal time information Ti obtained from the RTC 22a in which time is set highly precisely. Accordingly, the image capture date information and the image capture time information can be highly precisely generated.

Figure 5:
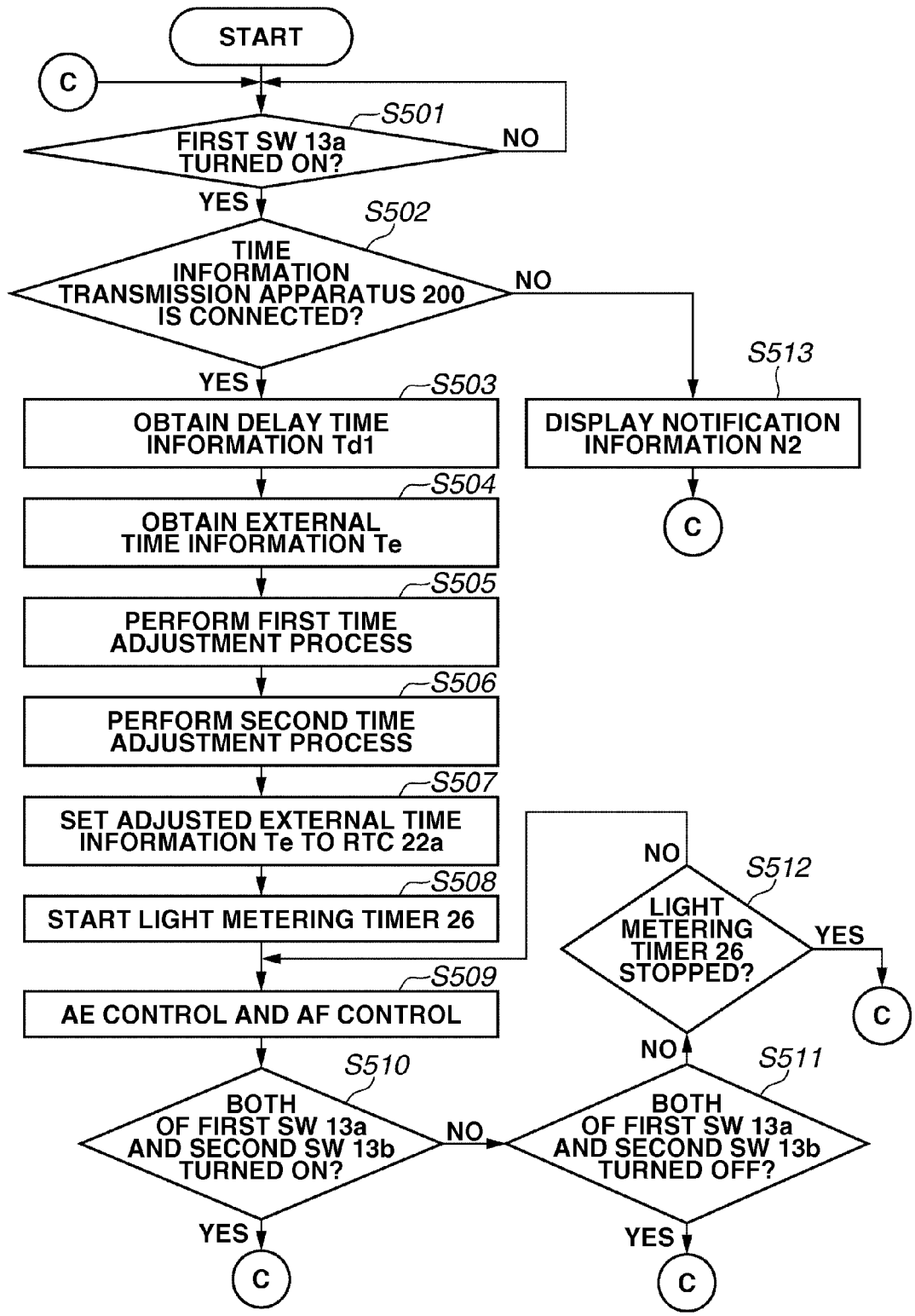
FIG. 5 is a flow chart illustrating a second RTC setting process to be executed by the image capture apparatus according to the first exemplary embodiment.

FIG. 5 is a flow chart illustrating the second RTC setting process to be executed by the image capture apparatus 100 according to the first exemplary embodiment.

The second RTC setting process is started, for example, when the power switch 24 is turned ON and the image capture apparatus 100 is activated. The second RTC setting process is controlled by the CPU 11. The CPU 11 can control the second RTC setting process by executing the program Pg2 stored in the memory 20.

In step S501, the CPU 11 determines whether only the first SW 13a among the first SW 13a and the second SW 13b is turned ON. The first SW 13a is turned ON when the release switch 13 is half pressed.

If only the first SW 13a among the first SW 13a and the second SW 13b is turned ON (YES in step S501), the CPU 11 advances from step S501 to step S502. If both of the first SW 13a and the second SW 13b are in the OFF state (NO in step S501), the CPU 11 repeats the process in step S501.

In step S502, the CPU 11 determines whether the image capture apparatus 100 and the time information transmission apparatus 200 are communicably connected to each other. The time information transmission apparatus 200 is an external time source capable of generating the external time information Te as precise time information.

If the image capture apparatus 100 and the time information transmission apparatus 200 are communicably connected to each other (YES in step S502), the CPU 11 advances from step S502 to step S503. If the image capture apparatus 100 and the time information transmission apparatus 200 are not communicably connected to each other (NO in step S502), the CPU 11 advances from step S502 to step S513.

In step S503, the CPU 11 obtains the delay time information Td1 from the memory 23. The delay time information Td1 indicates a delay time DT1 generated in a communication path between the CPU 11 and the RTC 22a. In the second RTC setting process, the delay time measurement process is not performed in order to preferentially perform the AE control and the AF control. In the delay time measurement process, the latest delay time DT1 generated in the communication path between the CPU 11 and the RTC 22a is detected.

In step S504, the CPU 11 obtains the external time information Te from the time information transmission apparatus 200 via the communication unit 25. The external time information Te is precise time information generated in the time information transmission apparatus 200.

In step S505, the CPU 11 performs the first time adjustment process for adjusting the external time information Te obtained in step S504 so as to be more precise time information. In the first time adjustment process, the CPU 11 adds the external time information Te obtained in step S502, the delay time information Td2, and the delay time information Td3. The delay time information Td2 indicates the delay time DT2 generated in the communication path between the image capture apparatus 100 and the time information transmission apparatus 200. The delay time information Td3 indicates the delay time DT3 generated in the communication path between the communication unit 25 and the CPU 11. In step S505, in a case where the time information transmission apparatus 200 generates the external time information Te and adds the delay time information Td2 to the external time information Te, the CPU 11 does not add the delay time information Td2 to the external time information Te obtained in step S504.

In step S506, the CPU 11 performs the second time adjustment process for adjusting the external time information Te adjusted in step S505 so as to be more precise time information. In the second time adjustment process, the CPU 11 adds the delay time information Td1 obtained in step S503 to the external time information Te adjusted in step S505. In a case where a value of the delay time information Td1 obtained in step S503 is zero, a value of the external time information Te adjusted in step S506 is equivalent to a value of the external time information Te adjusted in step S505.

In step S507, the CPU 11 sets the external time information Te adjusted in step S506 to the RTC 22a such that the RTC 22a can generate more precise internal time information Ti. Accordingly, the CPU 11 can adjust the RTC 22a such that the RTC 22a can generate more precise time information. In step S507, the CPU 11 operates as a time setting unit for setting a time of the RTC 22a.

In step S508, the CPU 11 transmits a count start command to the light metering timer 26. After the light metering timer 26 receives the count start command from the CPU 11, the light metering timer 26 starts counting from zero. A count value of the light metering timer 26 is supplied to the CPU 11 from the light metering timer 26.

In step S509, the CPU 11 transmits an AE start command to the AE control unit 18 and transmits an AF start command to the AF control unit 19. After the AE control unit 18 receives the AE start command from the CPU 11, the AE control unit 18 performs the AE control to calculate an appropriate and adequate exposure parameter. The CPU 11 controls the diaphragm 18a based on the exposure parameter calculated by the AE control unit 18. After the AF control unit 19 receives the AF start command from the CPU 11, the AF control unit 19 performs the AF control to calculate an appropriate focus parameter. The CPU 11 controls the lens unit 19a based on the focus parameter calculated by the AF control unit 19.

In step S510, the CPU 11 determines whether both of the first SW 13a and the second SW 13b are turned ON. Both of the first SW 13a and the second SW 13b are turned ON when the release switch 13 is fully pressed. If the CPU 11 detects that the release button of the remote controller of the image capture apparatus 100 is pressed, the CPU 11 determines that both of the first SW 13a and the second SW 13b are turned ON.

In a case where both of the first SW 13a and the second SW 13b are turned ON (YES in step S510), the CPU 11 returns to step S501. Since the image capture process illustrated in FIG. 4 and the second RTC setting process illustrated in FIG. 5 are executed in parallel with each other, in a case of YES in step S510 (i.e., YES in step S401), the CPU 11 advances from step S401 to step S402. In a case where neither the first SW 13a nor the second SW 13b are turned ON (NO in step S510), the CPU 11 advances from step S510 to step S511.

In step S511, the CPU 11 determines whether both of the first SW 13a and the second SW 13b are turned OFF. In a case where the release switch 13 is neither half pressed nor fully pressed, both of the first SW 13a and the second SW 13b are turned OFF.

In a case where both of the first SW 13a and the second SW 13b are turned OFF (YES in step S511), the CPU 11 returns to step S501. In a case where the first SW 13a is in the ON state and the second SW 13b is in the OFF state (NO in step S511), the CPU 11 advances from step S511 to step S512.

In step S512, the CPU 11 determines whether the count value supplied from the light metering timer 26 to the CPU 11 reaches a predetermined value.

If the count value supplied from the light metering timer 26 to the CPU 11 reaches the predetermined value (YES in step S512), the CPU 11 stops the light metering timer 26 and returns to step S501. If the count value supplied from the light metering timer 26 to the CPU 11 does not reach the predetermined value (NO in step S512), the CPU 11 does not stop the light metering timer 26 and returns to step S509 from step S512.

In step S513, the CPU 11 causes the display unit 16 to display notification information N2 for notifying the user to the effect that the image capture apparatus 100 and the time information transmission apparatus 200 are not communicably connected to each other. The display unit 16 displays the notification information N2 for a predetermined time period. After the notification information N2 is displayed on the display unit 16, the CPU 11 returns to step S501.

As described above, according to the second RTC setting process of the first exemplary embodiment, in a case where the release switch 13 is half pressed, the external time information Te can be adjusted using the delay time information Td1, Td2, and Td 3 stored in the memory 23. Thus, the adjusted external time information Te can be set to the RTC 22a. Accordingly, highly-precise time setting of the RTC 22a can be realized without calculating, in real time, the delay times TD1 and TD2 generated in the image capture apparatus 100 and the delay time TD3 generated in the communication path between the image capture apparatus 100 and the time information transmission apparatus 200.

Furthermore, according to the second RTC setting process of the first exemplary embodiment, generation of the delay time information Td1, Td2, and Td3 can be omitted. Accordingly, a time period from when the first SW 13a is turned ON to when the AE control and the AF control are started can be shortened as much as possible.

Furthermore, according to the second RTC setting process of the first exemplary embodiment, a highly-precise time setting of the RTC 22a can be performed every time the release switch 13 is half pressed. Accordingly, the image capture apparatus 100 can generate the image capture time information to be stored in the storage medium 21 with the image data more highly-precisely.

In the second RTC setting process according to the first exemplary embodiment, the time of the RTC 22a is set before the AE control and the AF control are performed. However, if the user desires to perform the AE control and the AF control as soon as possible, the time setting of the RTC 22a can be omitted. In this case, the process in steps S502 through S507 and step S513 are omitted.

Figure 6:
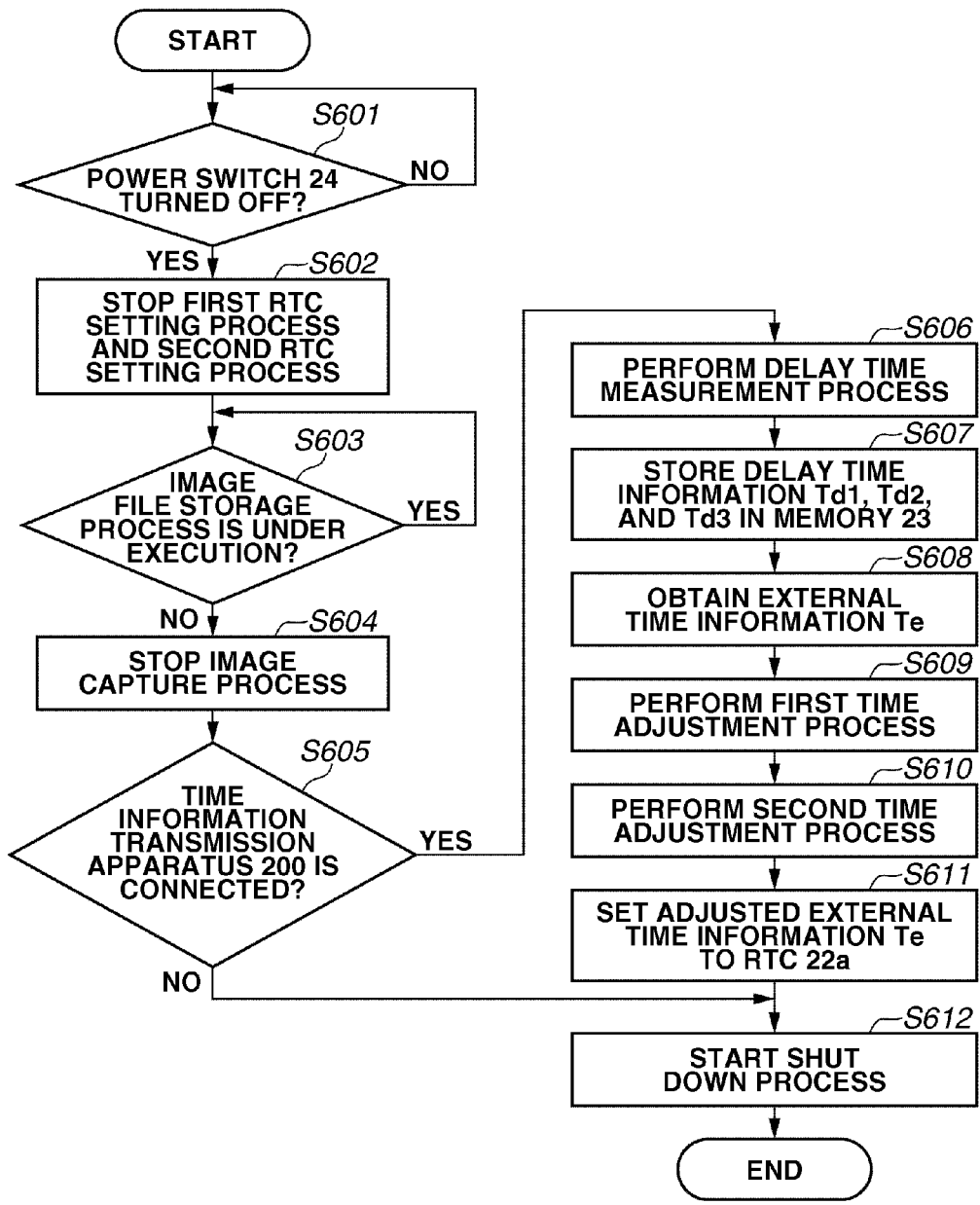
FIG. 6 is a flow chart illustrating a third RTC setting process to be executed by the image capture apparatus according to the first exemplary embodiment.

FIG. 6 is a flow chart illustrating the third RTC setting process to be executed by the image capture apparatus 100 according to the first exemplary embodiment.

The third RTC setting process is started, for example, when the power switch 24 is turned ON and the image capture apparatus 100 is activated. The third RTC setting process is controlled by the CPU 11. The CPU 11 can control the third RTC setting process by executing the program Pg3 stored in the memory 20.

In step S601, the CPU 11 determines whether the power switch 24 is turned OFF.

If the power switch 24 is turned OFF (YES in step S601), the CPU 11 advances from step S601 to step S602.

If the power switch 24 is not OFF (NO in step S601), the CPU 11 repeats the process in step S601.

In step S602, the CPU 11 stops the first RTC setting process and the second RTC setting process which are performed in parallel with the third RTC setting process. Accordingly, the third RTC setting process is preferentially performed over the first RTC setting process and the second RTC setting process.

In step S603, the CPU 11 determines whether the image file storage process in step S411 is under execution.

When the image file storage process in step S411 is under execution (YES in step S603), the CPU 11 repeats the process in step S603 until the storing process ends.

When the image file storage process in step S411 is not under execution (NO in step S603), the CPU 11 advances from step S603 to step S604.

In step S604, the CPU 11 stops the image capture process performed in parallel with the third RTC setting process. Accordingly, the third RTC setting process is preferentially performed over the image capture process.

In step S605, the CPU 11 determines whether the image capture apparatus 100 and the time information transmission apparatus 200 are communicably connected to each other. The time information transmission apparatus 200 is an external time source capable of generating the external time information Te as precise time information.

If the image capture apparatus 100 and the time information transmission apparatus 200 are communicably connected to each other (YES in step S605), the CPU 11 advances from step S605 to step S606.

If the image capture apparatus 100 and the time information transmission apparatus 200 are not communicably connected to each other (NO in step S605), the CPU 11 advances from step S605 to step S612.

In step S606, the CPU 11 performs the delay time measurement process in order to detect at least one of the delay time DT1, the delay time DT2, and the delay time DT3. The delay time DT1 indicates the latest delay time generated in the communication path between the CPU 11 and the RTC 22a. The delay time DT2 indicates the latest delay time generated in the communication path between the image capture apparatus 100 and the time information transmission apparatus 200. The delay time DT3 indicates the latest delay time generated in the communication path between the communication unit 25 and the CPU 11.

In step S607, the CPU 11 generates at least one of the delay time information Td1, the delay time information Td2, and the delay time information Td3. In a case where the delay time DT1 is detected in step S606, the CPU 11 generates the delay time information Td1 based on the delay time DT1 detected in step S606 and stores the generated delay time information Td1 in the memory 23. In a case where the delay time DT2 is detected in step S606, the CPU 11 generates the delay time information Td2 based on the delay time DT2 detected in step S606 and stores the generated delay time information Td2 in the memory 23. In a case where the delay time DT3 is detected in step S606, the CPU 11 generates the delay time information Td3 based on the delay time DT3 detected in step S606 and stores the generated delay time information Td3 in the memory 23.

In step S608, the CPU 11 obtains the external time information Te from the time information transmission apparatus 200 via the communication unit 25. The external time information Te is precise time information generated in the time information transmission apparatus 200.

In step S609, the CPU 11 performs a first time adjustment process for adjusting the external time information Te obtained in step S608 so as to be more precise time information. In the first time adjustment process, the CPU 11 adds the external time information Te obtained in step S608, the delay time information Td2, and the delay time information Td3. The delay time information Td2 indicates the delay time DT2 generated in the communication path between the image capture apparatus 100 and the time information transmission apparatus 200. The delay time information Td3 indicates the delay time DT3 generated in the communication path between the communication unit 25 and the CPU 11. In step S609, in a case where the time information transmission apparatus 200 generates the external time information Te and adds the delay time information Td2 to the external time information Te, the CPU 11 does not add the delay time information Td2 to the external time information Te obtained in step S608.

In step S610, the CPU 11 performs a second time adjustment process for adjusting the external time information Te adjusted in step S609 so as to be more precise time information. In the second time adjustment process, the CPU 11 adds the delay time information Td1 generated in step S607 to the external time information Te adjusted in step S609.

In step S611, the CPU 11 sets the external time information Te adjusted in step S610 to the RTC 22a such that the RTC 22a can generate more precise internal time information Ti. Accordingly, the CPU 11 can adjust the RTC 22a such that the RTC 22a can generate more precise time information. In step S611, the CPU 11 operates as a time setting unit for setting a time of the RTC 22a.

In step S612, the CPU 11 starts shut down process for shutting down the image capture apparatus 100. After the shut down process ends, the CPU 11 ends the third RTC setting process.

As described above, according to the third RTC setting process of the first exemplary embodiment, in a case where the user instructs execution of the time setting function, the CPU 11 can generate the delay time information Td1, Td2, and Td3 and store these generated information in the memory 23. Furthermore, the CPU 11 can adjust the external time information Te using the delay time information Td1, Td2, and Td3 stored in the memory 23 and set the adjusted external time information Te to the RTC 22a. Accordingly, highly-precise time setting of the RTC 22a can be realized without calculating, in real time, the delay times TD1 and TD2 generated in the image capture apparatus 100 and the delay time TD3 generated in the communication path between the image capture apparatus 100 and the time information transmission apparatus 200.

Furthermore, according to the third RTC setting process of the first exemplary embodiment, every time the power switch 24 is turned OFF, the time of the RTC 22a can be set more highly precisely. Accordingly, even in a case where the image capture apparatus 100 is activated in a state that the image capture apparatus 100 is not connected to the time information transmission apparatus 200, the RTC 22a can generate highly-precise internal time information Ti.

According to the third RTC setting process of the first exemplary embodiment, the image file storage process in step S411 can be preferentially performed over the time setting of the RTC 22a. Accordingly, a captured image can be prevented from being lost before being stored in the storage medium 21.

In the third RTC setting process according to the first exemplary embodiment, the time setting of the RTC 22a is performed before performing the shut down process. However, in a case where the user desires to shut down the apparatus as soon as possible, the time setting of the RTC 22a can be omitted. In this case, the process in steps S605 through S611 is omitted.

As described above, the image capture apparatus 100 can perform more highly-precise time setting with respect to the RTC 22a (i.e., the internal time source) in each of steps S309, S507, and S611.

The image capture apparatus 100 can perform more highly-precise time setting of the RTC 22a in consideration with the delay time generated in the communication path between the RTC 22a (i.e., the internal time source) and the CPU 11.

Furthermore, the image capture apparatus 100 can perform more highly-precise time setting of the RTC 22a without calculating, in real time, the delay time generated in the communication path between the RTC 22a (i.e., the internal time source) and the CPU 11 (i.e., the time setting unit).

Furthermore, the image capture apparatus 100 can perform more highly-precise time setting of the RTC 22a in consideration with the delay time generated in the communication path between the communication unit 25 for receiving the external time information and the CPU 11 (i.e., the time setting unit).

Furthermore, the image capture apparatus 100 can perform more highly-precise time setting of the RTC 22a without calculating, in real time, the delay time generated in the communication path between the communication unit 25 for receiving the external time information and the CPU 11 (i.e., the time setting unit).

According to the present exemplary embodiment, a case where the image capture apparatus 100 generates the delay time information Td1, Td2, and Td3 is described. However, the generation of the delay time information Td2 and Td3 can be omitted. In this case, a configuration of the image capture apparatus 100 can be more simplified.

The various functions and processes described in the first exemplary embodiment can be realized by a personal computer, a micro computer, a central processing unit (CPU), and so on with use of a program. In a second exemplary embodiment described below, the personal computer, the micro computer, and the CPU are referred to as a "computer X". According to the second exemplary embodiment, a program for controlling the computer X and for realizing the various functions and processes as described in the first exemplary embodiment is referred to as a "program Y".

The various functions and processes as described in the first exemplary embodiment are realized such that the computer X executes the program Y. In this case, the program Y is supplied to the computer X via a computer-readable recording medium. The computer-readable recording medium according to the second exemplary embodiment includes at least one of a hard disk device, an optical disk, a compact disk read only memory (CD-ROM), a compact-disk recordable (CD-R), a memory card, a read only memory (ROM), and a random access memory (RAM). The computer-readable recording medium according to the second exemplary embodiment is a non-transitory recording medium.

While the present invention has been described with reference to the disclosed exemplary embodiments, it is to be understood that the present invention is not limited to the disclosed exemplary embodiments. The scope of the following claims is to be accorded the broadest interpretation so as to encompass all modifications and equivalent structures.

This application claims the benefit of Japanese Patent Application No. 2012-045902 filed Mar. 1, 2012, which is hereby incorporated by reference herein in its entirety.

What is claimed is:

1. An image capture apparatus comprising:
an internal time information generating unit that Includes an internal time source;
a receiving unit configured to receive external time information generated in an external time source; and
an adjusting unit configured to (a) adjust the external time information using a first delay time information corresponding to a delay time generated in a first communication path between the internal time information generating unit and a time setting unit,(b)adjust the external time information using second delay time information corresponding to a delay time generated in a second communication path between the external time source and the image capture apparatus, and (c) adjust the external time information using third delay time information corresponding to a delay time generated in a third communication path between the receiving unit and the time setting unit,
wherein the first communication path and the second communication path are internal communication paths existing in the image capture apparatus, and the third communication path is an external communication path which does not exist in the image capture apparatus, and
wherein the time setting unit is configured to perform a process for setting the external time information adjusted by the adjusting unit to the internal time source.

2. The image capture apparatus according to claim 1, wherein the internal time source includes a real time clock.

3. The image capture apparatus according to claim 1,wherein the image capture apparatus is configured to act as a digital camera.

4. The image capture apparatus according to claim 1, wherein the image capture apparatus is configured to act as a cell phone with a camera.

5. The image capture apparatus according to claim 1, wherein the image capture apparatus includes at least one of a digital camera, a digital video camera, a cell phone with a camera, a portable terminal with a camera, and a computer with a camera.

6. A non-transitory storage medium that stores a program for causing a computer to act as the image capture apparatus according to claim 1.

7. A method comprising:
receiving external time information generated in an external time source;
adjusting the external time information using first delay time information corresponding to a delay time generated in a first communication path between an internal time information generating unit and a time setting unit, wherein the internal time information generating unit and the time setting unit are included in an image capture apparatus, and wherein an internal time source is included in the internal time information generating unit;
adjusting the external time information using second delay time information corresponding to a delay time generated in a second communication path between the external time source and the image capture apparatus;
adjusting the external time information using third delay time information corresponding to a delay time generated in a third communication path between the receiving unit and the time setting unit,
wherein the first communication path and the second communication path are internal communication paths existing in the image capture apparatus, and the third communication patch is an external communication path which does not exist in the image capture apparatus; and
performing a process for setting the adjusted external time information to the internal time source.

8. The method according to claim 7, wherein the internal time source includes a real time clock.

9. The method according to claim 7, wherein the image capture apparatus is configured to act as a digital camera.

10. The method according to claim 7, wherein the image capture apparatus is configured to act as a cell phone with a camera.

11. The method according to claim 7, wherein the image capture apparatus includes at least one of a digital camera, a digital video camera, a cell-phone with a camera, a portable terminal with a camera, and a computer with a camera.

12. The method according to claim 7, wherein the third communication path includes a wired communication path.

13. The method according to claim 7, wherein the third communication path includes a wireless communication path.

14. The method according to claim 7, wherein the internal time source has a resolution of $1/100$ second.

15. The method according to claim 7, further comprising generating at least one of the first delay time information, the second delay time information, and the third delay time information.

16. A non-transitory storage medium that stores a program for causing a computer to execute a method, the method comprising:
receiving external time information generated in an external time source;
adjusting the external time information using first delay time information corresponding to a delay time generated in a first communication path between an internal time information generating unit and a time setting unit, wherein the internal time information generating unit and the time setting unit are included in an image capture apparatus, and wherein an internal time source is included in the internal time information generating unit;

adjusting the external time information using second delay time information corresponding to a delay time generated in a second communication path between the external time source and the image capture apparatus;

adjusting the external time information using third delay time information corresponding to a delay time generated in a third communication path between the receiving unit and the time setting unit, wherein the first communication path and the second communication path are internal communication paths existing in the image capture apparatus, and the third communication patch is an external communication path which does not exist in the image capture apparatus; and performing a process for setting the adjusted external time information to the internal time source.

17. The image capture apparatus according to claim 1, wherein the third communication path includes a wired communication path.

18. The image capture apparatus according to claim 1, wherein the third communication path includes a wireless communication path.

19. The image capture apparatus according to claim 1, wherein the internal time source has a resolution of $\frac{1}{100}$ second.

20. The image capture apparatus according to claim1, further comprising a generating unit that generates at least one of the first delay time information, the second delay time information, and the third delay time information.

\* \* \* \* \*